United States Patent
Yamanaka et al.

(10) Patent No.: US 9,609,292 B2
(45) Date of Patent: Mar. 28, 2017

(54) IMAGING DEVICE, ADJUSTING DEVICE, AND ADJUSTING METHOD

(71) Applicants: Yuji Yamanaka, Kanagawa (JP); Kensuke Masuda, Kanagawa (JP); Go Maruyama, Kanagawa (JP); Sho Nagai, Kanagawa (JP)

(72) Inventors: Yuji Yamanaka, Kanagawa (JP); Kensuke Masuda, Kanagawa (JP); Go Maruyama, Kanagawa (JP); Sho Nagai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 85 days.

(21) Appl. No.: 14/635,350

(22) Filed: Mar. 2, 2015

(65) Prior Publication Data

US 2015/0256801 A1 Sep. 10, 2015

(30) Foreign Application Priority Data

Mar. 4, 2014 (JP) ................................. 2014-042115

(51) Int. Cl.
*H04N 9/083* (2006.01)
*H04N 9/07* (2006.01)
*H04N 5/225* (2006.01)
*H04N 5/235* (2006.01)
*H04N 9/04* (2006.01)

(52) U.S. Cl.
CPC ............. *H04N 9/07* (2013.01); *H04N 5/2254* (2013.01); *H04N 5/2351* (2013.01); *H04N 5/2353* (2013.01); *H04N 9/045* (2013.01)

(58) Field of Classification Search
CPC .......... H04N 9/049; H04N 9/07; H04N 9/045; H04N 9/083; H04N 5/2254; H04N 5/2351; H04N 5/2353

USPC ................................. 348/270, 234, 336, 273
See application file for complete search history.

(56) References Cited

U.S. PATENT DOCUMENTS

| | | | | |
|---|---|---|---|---|
| 6,760,475 | B1 * | 7/2004 | Miller | G01J 3/26 348/E9.01 |
| 2014/0152983 | A1 * | 6/2014 | Masuda | G01J 3/513 356/302 |
| 2015/0326771 | A1 * | 11/2015 | Maruyama | H04N 5/2353 348/234 |

FOREIGN PATENT DOCUMENTS

| | | |
|---|---|---|
| JP | 2013-214950 | 10/2013 |
| JP | 2015109523 A | 6/2015 |

* cited by examiner

*Primary Examiner* — Antoinette Spinks
(74) *Attorney, Agent, or Firm* — Harness, Dickey & Pierce, P.L.C.

(57) ABSTRACT

An imaging device includes a filter unit including filter areas having different wavelength selectivities; a light receiving element array configured to receive light transmitted through the filter unit; a storage unit configured to store, for each filter area, positional information indicating a position at which light transmitted is received on the light receiving element array; an area detector configured to detect, based on the positional information, an image area corresponding to the light transmitted from an image output by the light receiving element array when light from an object enters the filter unit; and a color detector configured to detect a color of the object based on an output value of the image area. The positional information indicates a position on the light receiving element array identified by using a spectral-response-coincidence-degree indicating a degree of coincidence between a spectral responsivity of each pixel and a desired wavelength selectivity.

10 Claims, 7 Drawing Sheets

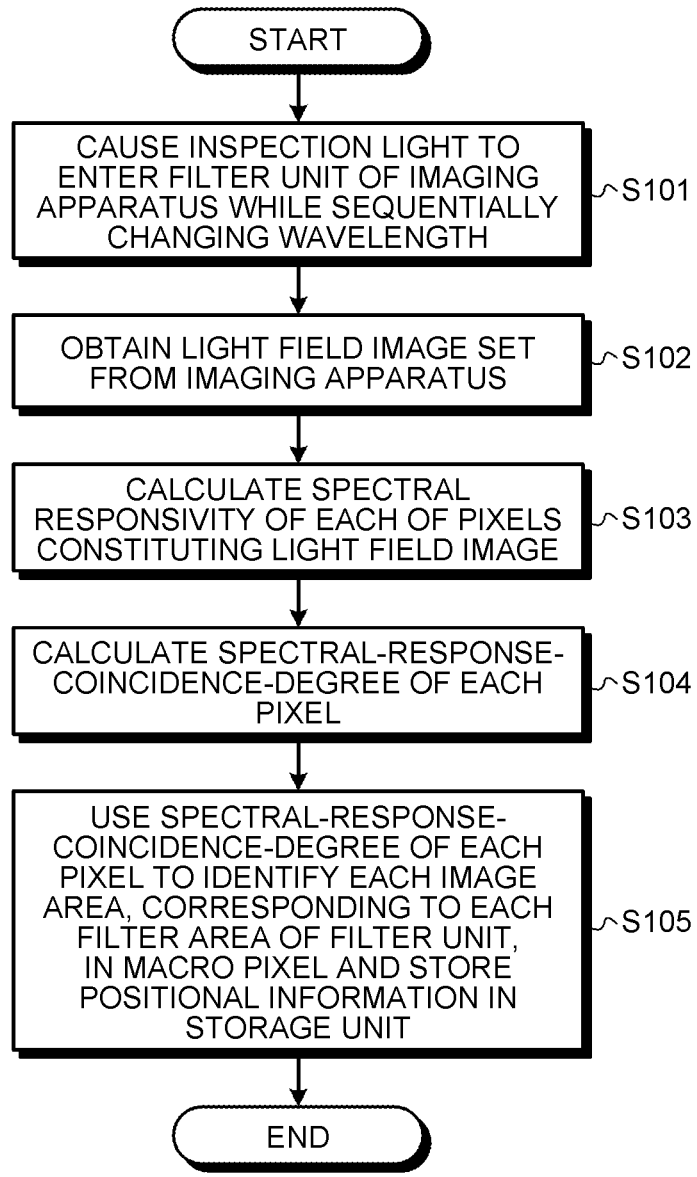

IMAGING DEVICE, ADJUSTING DEVICE, AND ADJUSTING METHOD

CROSS-REFERENCE TO RELATED APPLICATION

The present application claims priority to and incorporates by reference the entire contents of Japanese Patent Application No. 2014-042115 filed in Japan on Mar. 4, 2014.

BACKGROUND OF THE INVENTION

1. Field of the Invention

The present invention relates to an imaging device with a function of detecting a color of an object, an adjusting device that adjusts the imaging device, and an adjusting method.

2. Description of the Related Art

Conventionally, known has been an imaging device that receives light from an object through spatially splitting the light into a plurality of light beams having different wavelength characteristics and outputs an image including a plurality of areas corresponding to the split light beams as disclosed in Japanese Laid-open Patent Publication No. 2013-214950, for example. In the imaging device disclosed in Japanese Laid-open Patent Publication No. 2013-214950, a filter unit is arranged at a stage prior to a micro lens array with a configuration of a plenoptic camera, the filter unit including a plurality of filter areas having different wavelength selectivities. Light serially transmitted through the filter unit and the micro lens array is received by a light receiving element array and a light field image in which partial images (hereinafter referred to as "macro pixels") corresponding to respective micro lenses constituting the micro lens array are arrayed is output.

Each of the macro pixels within the light field image has a plurality of image areas corresponding to the plurality of filter areas of the filter unit. It is possible, by taking out from the macro pixels and rearranging output values of image areas dealing with a common filter area, to generate a plurality of images depending on the intensity of light beams transmitted through each filter area. It is then possible to use the plurality of images for the purpose of detecting a color of an object, for example.

However, it is difficult in the imaging device disclosed in Japanese Laid-open Patent Publication No. 2013-214950 to accurately identify what position and what filter area correspond to each other in each of the macro pixels within the light field image and there is a concern about a problem in detecting a color of an object, for example.

Therefore, there is a need for an imaging device capable of accurately identifying a position, corresponding to each filter area of the filter unit, within an image, an adjusting device, and an adjusting method.

SUMMARY OF THE INVENTION

It is an object of the present invention to at least partially solve the problems in the conventional technology.

According to an embodiment, there is provided an imaging device that includes a filter unit including a plurality of filter areas having different wavelength selectivities; a light receiving element array configured to receive light transmitted through the filter unit and output an image; a storage unit configured to store, for each of the filter areas, positional information indicating a position at which light transmitted through each of the filter areas is received on the light receiving element array; an area detector configured to detect, based on the positional information, an image area corresponding to the light transmitted through each of the filter areas from the image output by the light receiving element array when light from an object enters the filter unit; and a color detector configured to detect a color of the object based on an output value of the detected image area. The positional information corresponding to each of the filter areas indicates a position on the light receiving element array which is identified by using a spectral-response-coincidence-degree indicating a degree of coincidence between a spectral responsivity of each pixel and a desired wavelength selectivity, the spectral responsivity of each pixel being calculated based on a set of images output by the light receiving element array when monochromatic inspection light with a different wavelength sequentially enters the filter unit.

According to another embodiment, there is provided an adjusting device for adjusting an imaging device that includes a filter unit including a plurality of filter areas having different wavelength selectivities, a light receiving element array configured to receive light transmitted through the filter unit and output an image, and a storage unit configured to store, for each of the filter areas, positional information indicating a position at which light transmitted through each of the filter areas is received on the light receiving element array. The adjusting device includes an inspection light generator configured to cause monochromatic inspection light with a different wavelength to sequentially enter the filter unit; a spectral-response-coincidence-degree calculator configured to calculate a spectral responsivity of each pixel based on a set of images output by the light receiving element array when the inspection light enters the filter unit, and calculate a spectral-response-coincidence-degree indicating a degree of coincidence between a desired wavelength selectivity and the spectral responsivity; and a position identifier configured to identify the position at which the light transmitted through each of the filter areas is received on the light receiving element array by using the obtained spectral-response-coincidence-degree, and store in the storage unit the positional information indicating the identified position as the positional information corresponding to each of the filter areas.

According to still another embodiment, there is provided an adjusting method for adjusting an imaging device that includes a filter unit including a plurality of filter areas having different wavelength selectivities, a light receiving element array configured to receive light transmitted through the filter unit and output an image, and a storage unit configured to store, for each of the filter areas, positional information indicating a position at which light transmitted through each of the filter areas is received on the light receiving element array. The adjusting method includes: causing monochromatic inspection light with a different wavelength to sequentially enter the filter unit; calculating a spectral responsivity of each pixel based on a set of images output by the light receiving element array when the inspection light enters the filter unit; calculating a spectral-response-coincidence-degree indicating a degree of coincidence between a desired wavelength selectivity and the spectral responsivity; identifying the position at which the light transmitted through each of the filter areas is received on the light receiving element array by using the obtained spectral-response-coincidence-degree; and storing in the storage unit the positional information indicating the identified position as the positional information corresponding to each of the filter areas.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a flowchart of a procedure of a processing of an adjusting device in making an adjustment to the imaging device.

DETAILED DESCRIPTION OF THE PREFERRED EMBODIMENTS

Exemplary embodiments of an imaging device, an adjusting device, and an adjusting method according to the present invention will be explained in detail below with reference to the accompanying drawings. While embodiments to be explained below present an example of applying the present invention to an imaging device with a configuration of a plenoptic camera, an applicable imaging device is not limited thereto. The present invention is widely applicable to any imaging devices that receive light from an object through spatially splitting the light into a plurality of light beams having different wavelength characteristics and output an image including a plurality of areas corresponding to the split light beams.

First Embodiment

Figure 1:
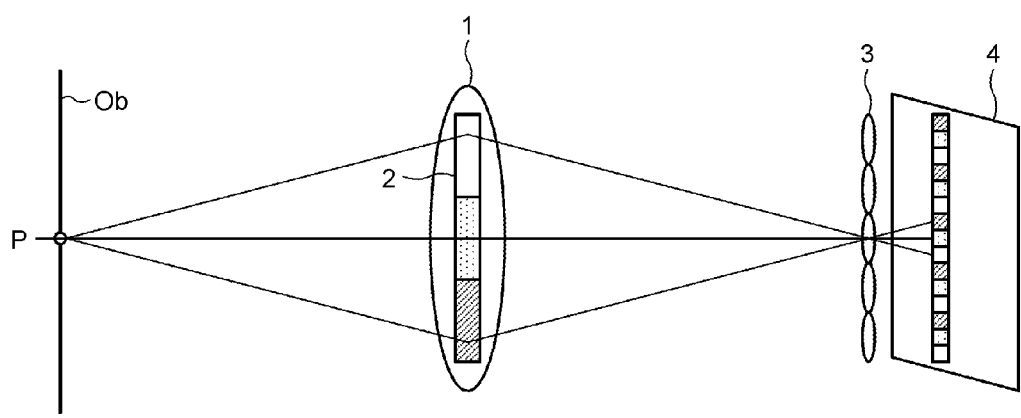
FIG. 1 is a conceptual diagram of an optical system in an imaging device according to an embodiment.

FIG. 1 is a conceptual diagram of an optical system in an imaging device according to an embodiment. In FIG. 1, a main lens 1 that functions as an imaging lens is illustrated as a single lens and an aperture position of the main lens 1 is illustrated at the center of the single lens for easy-to-understand explanation.

At the aperture position of the main lens 1, a filter unit 2 is arranged. While the filter unit 2 is illustrated in FIG. 1 as if the filter unit 2 is arranged within the main lens 1 illustrated as a single lens, the filter unit 2 is not arranged in an inside of the lens, in fact.

The filter unit 2 includes a plurality of filter areas having different wavelength selectivities. In the present embodiment, a color filter that deals with tristimulus values of colors with spectral transmission based on a color-matching function of an XYZ color system defined by CIE is used for the filter unit 2.

Figure 2:
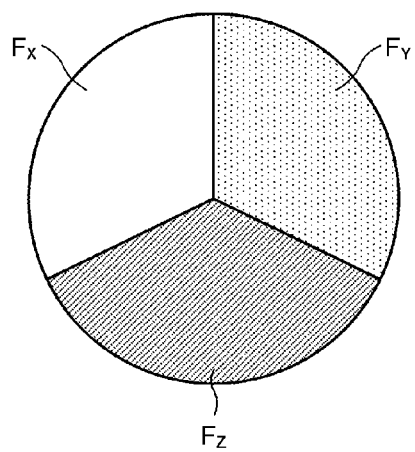
FIG. 2 illustrates an example of a geometric design of a filter unit.

FIG. 2 illustrates an example of a geometric design of the filter unit 2 according to the present embodiment. As illustrated in FIG. 2, the filter unit 2 according to the present embodiment is provided with three filter areas $F_X$, $F_Y$, and $F_Z$ designed based on a color-matching function of an XYZ color system.

Figure 3:
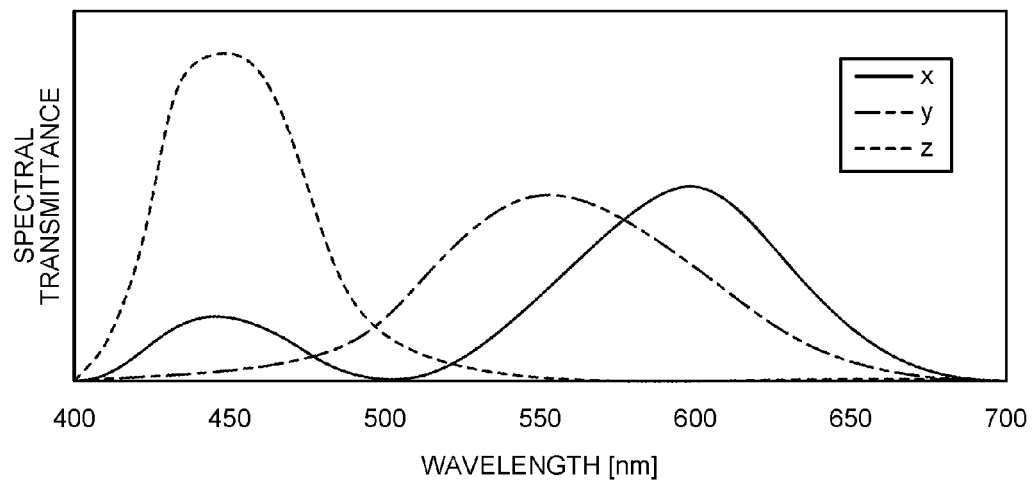
FIG. 3 illustrates a spectral transmission of the filter unit.

FIG. 3 illustrates a spectral transmission of the filter unit 2 according to the present embodiment. A solid line indicates a spectral transmission $T_X(\lambda)$ of the filter area $F_X$, an alternate long and short dash line indicates a spectral transmission $T_Y(\lambda)$ of the filter area $F_Y$, and a dash line indicates a spectral transmission $T_Z(\lambda)$ of the filter area $F_Z$ in FIG. 3. These spectral transmissions $T_X(\lambda)$, $T_Y(\lambda)$, and $T_Z(\lambda)$ are obtained by substituting the color-matching function of the XYZ color system with transmission. The filter areas $F_X$, $F_Y$, and $F_Z$ of the filter unit 2 have respective wavelength selectivities different from each other. The filter unit 2 illustrated in FIGS. 2 and 3 is only one example and the present invention is not limited thereto. The number of filter areas in the filter unit 2 may be two, four, or more as long as the configuration includes multiple filter areas having different wavelength selectivities.

In the vicinity of a light condensing position of the main lens 1, a micro lens array 3 including a plurality of micro lenses (small lenses) is arranged. Besides, a light receiving element array 4 that receives light transmitted through the filter unit 2 and the micro lens array 3 and outputs an image is arranged on an image surface of an optical system. In the light receiving element array 4, which is a monochrome sensor on which a color filter for each pixel is not mounted, each light receiving element corresponds to one pixel of an image. A relation in ratio between a diameter of each of the micro lenses constituting the micro lens array 3 and a size of each of the light receiving elements constituting the light receiving element array 4 is 30:1 to 2:1, approximately.

Figure 4:
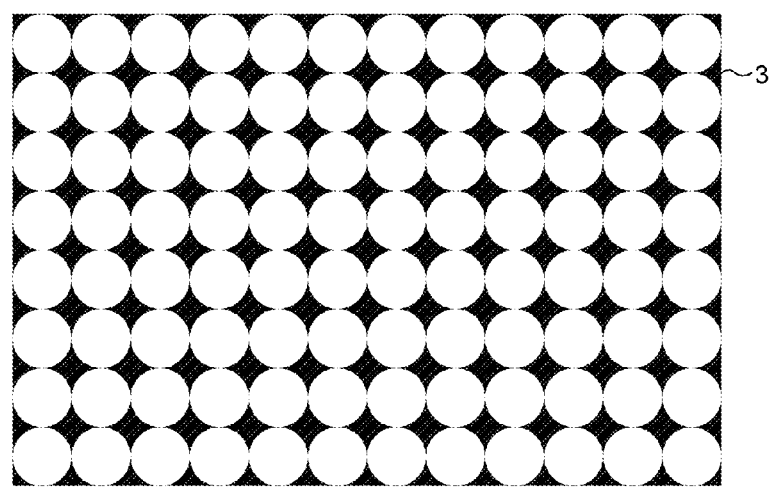
FIG. 4 is a plane view of a micro lens array seen from a direction of an optical axis.

FIG. 4 is a plane view of the micro lens array 3 seen from a direction of an optical axis P (see FIG. 1). Portions illustrated in white in FIG. 4 are respective micro lenses and portions illustrated in black are light shielding portions. The light shielding portion is a flat area not having a curvature and an area whose curvature does not meet design value specifications in manufacturing. Since there is a possibility with light from these areas that a light beam unintended in design is transmitted to a light receiving element, the areas are configured to provide, by being shielded, an electric signal which is assumed based on the design. This configuration is significant to obtain accurate measurement values.

In the imaging device according to the present embodiment, a light bundle which enters and passes through an aperture of the main lens 1 in the light emitted from an object Ob goes through the micro lens array 3 and is received by the light receiving element array 4. The light bundle entering the main lens 1 is a set of countless light beams and respective light beams pass through different positions of the aperture of the main lens 1. In the imaging device according to the present embodiment, the filter unit 2 including three filter areas $F_X$, $F_Y$, and $F_Z$ is arranged at the aperture position of the main lens 1. Hence, the light beams which pass through different positions of the aperture of the main lens 1 become three kinds of light beams having different wavelength characteristics by being transmitted through the three filter areas $F_X$, $F_Y$, and $F_Z$ having different spectral transmissions (wavelength selectivities).

The light beams transmitted through the filter unit 2 are once condensed in the vicinity of the micro lens array 3 and then diffused by an action of the micro lens array 3, and the light beams transmitted through the three filter areas $F_X$, $F_Y$, and $F_Z$ of the filter unit 2 reach different positions of the light receiving element array 4. In other words, the light beams transmitted through the aperture position of the main lens 1 differ in light reception position on a sensor plane of the light receiving element array 4 depending on what filter area the light beam is transmitted through among the three filter areas $F_X$, $F_Y$, and $F_Z$ of the filter unit 2. In the imaging device according to the present embodiment, it is therefore possible to measure values which are obtained by dissolving, into tristimulus values X, Y, and Z in wavelength, the light emitted from a certain one point of the object Ob.

Figure 5:
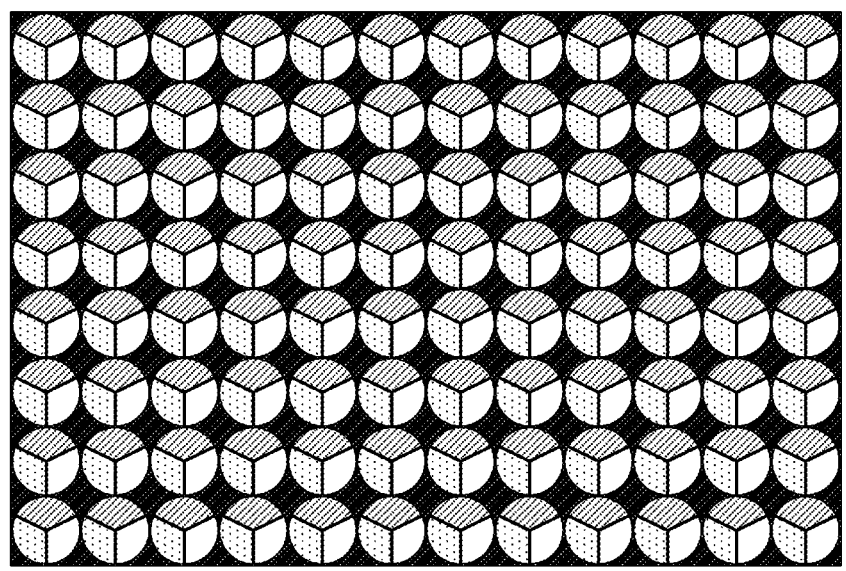
FIG. 5 illustrates a light field image captured by the imaging device.

FIG. 5 illustrates a light field image captured by the imaging device according to the present embodiment. When an image is captured by the imaging device according to the present embodiment, a light field image in which partial images each of which has a small circular shape are arranged is obtained as illustrated in FIG. 5. The reason why each of the partial images included in the light field image has a circular shape is that the shape of the aperture of the main lens 1 has a circular shape. Each of the small circular partial images included in the light field image is called "macro pixel". Each macro pixel is formed immediately beneath each of the micro lenses constituting the micro lens array 3.

Figure 6:
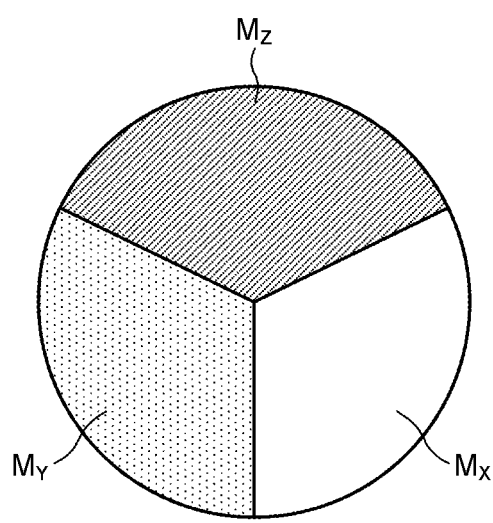
FIG. 6 illustrates an enlarged macro pixel.

FIG. 6 illustrates an enlarged macro pixel. An inner structure of a macro pixel corresponds to the structure (see FIG. 2) of the filter unit 2 arranged at the aperture position of the main lens 1. Specifically, each of the macro pixels included in the light field image captured by the imaging device according to the present embodiment is provided with an image area $M_X$ corresponding to the filter area $F_X$, an image area $M_Y$ corresponding to the filter area $F_Y$, and an image area $M_Z$ corresponding to the filter area $F_Z$ of the filter unit 2, as illustrated in FIG. 6. The image areas $M_X$, $M_Y$, and $M_Z$ in each macro pixel are respectively obtained by receiving respective light beams transmitted through the filter areas $F_X$, $F_Y$, and $F_Z$ of the filter unit 2. The reason why the inner structure of the macro pixel illustrated in FIG. 6 is turned upside down compared to the structure of the filter unit 2 illustrated in FIG. 2 is a transit of the optical system. Since depending on the optical system, the correspondence relation is not limited to this example.

In the imaging device according to the present embodiment, it is possible to measure, based on output values of the image areas $M_X$, $M_Y$, and $M_Z$ of the macro pixel, a spectral energy of an object position corresponding to the macro pixel. The output values of the image areas $M_X$, $M_Y$, and $M_Z$ of the macro pixel is set as $v=[v_X, v_Y, v_Z]^t$. Here, a symbol "t" indicates a transpose of matrix. For the output values, an average value of outputs of light receiving elements for each of the image areas $M_X$, $M_Y$, and $M_Z$ may be obtained or an output value of one selected light receiving element for each of the image areas $M_X$, $M_Y$, and $M_Z$ may be taken and adopted as a representative value. Here, it is possible to suppress an influence of electrical random noises and obtain robust signals against noises when an average value of the outputs of the light receiving elements for each of the image areas $M_X$, $M_Y$, and $M_Z$ is treated as an output value of each of the image areas $M_X$, $M_Y$, and $M_Z$.

The output values of the image areas $M_X$, $M_Y$, and $M_Z$ of the macro pixel are obtained by multiplying values which is obtained by dissolving, into tristimulus values X, Y, and Z in wavelength, the light emitted from the object Ob by a spectral sensitivity of the light receiving element array 4. Since the spectral sensitivity of the light receiving element array 4 is known at the designing stage, it is possible to obtain the tristimulus values X, Y, and Z of the light from the object Ob by dividing the respective output values by the spectral sensitivity of the light receiving element array 4. Based on the tristimulus values X, Y, and Z, it is then possible to detect the color (color values in XYZ color system) of the object Ob.

Here, it is necessary in the imaging device according to the present embodiment to identify what light receiving element of the light receiving element array 4 and what image area among $M_X$, $M_Y$, and $M_Z$ of the macro pixel correspond to each other in an actual device manufactured indeed to detect the color of the object Ob based on the output values of the image areas $M_X$, $M_Y$, and $M_Z$ of the macro pixel. In other words, since each actual device involves errors in production such as an alignment error in an optical system, for example, there is a possibility that the light receiving element, corresponding to each of the image areas $M_X$, $M_Y$, and $M_Z$ of the macro pixel, of the light receiving element array 4 differs from one device to another.

In the imaging device according to the present embodiment, the position of the light receiving element, corresponding to each of the image areas $M_X$, $M_Y$, and $M_Z$ of the macro pixel, of the light receiving element array 4, i.e., the position at which the light transmitted through each of the filter areas $F_X$, $F_Y$, and $F_Z$ of the filter unit 2 is received on the light receiving element array 4 is identified in a method to be explained later and positional information indicating the position is stored in the storage unit. The imaging device is configured to detect the image areas $M_X$, $M_Y$, and $M_Z$ of the macro pixel from the light field image output by the light receiving element array 4 by using the positional information stored in the storage unit and to detect the color of the object Ob based on the output values of the detected image areas $M_X$, $M_Y$, and $M_Z$.

Figure 7:
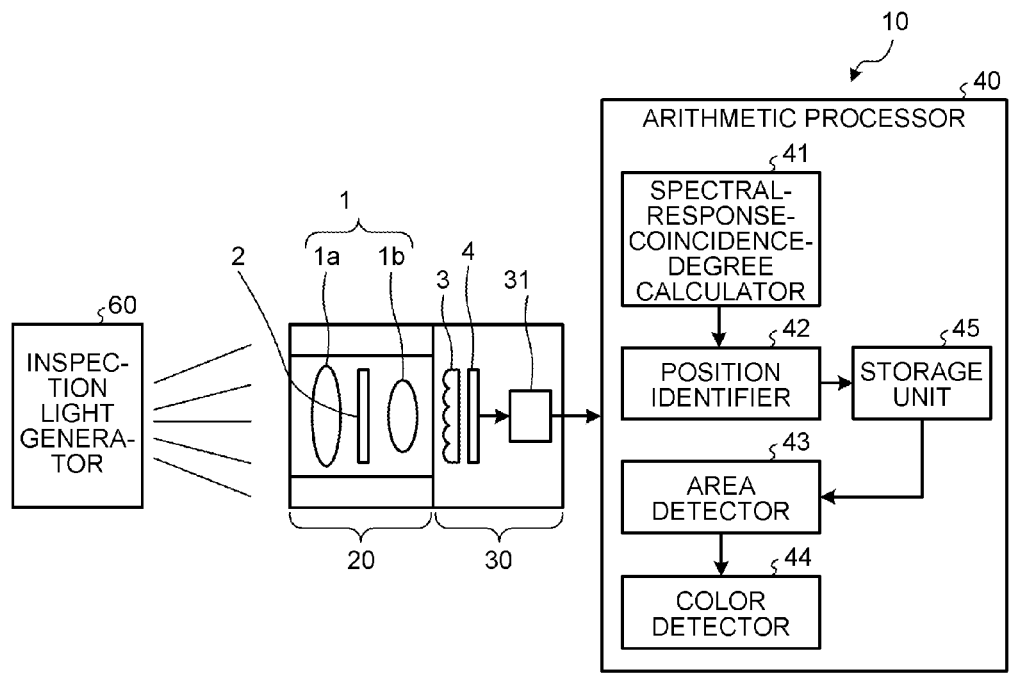
FIG. 7 illustrates an example of a specific configuration of an imaging device according to a first embodiment.

FIG. 7 illustrates an example of a specific configuration of the imaging device according to the present embodiment. An imaging device 10 illustrated in FIG. 7 is provided with a lens module 20, a camera unit 30, and an arithmetic processor 40.

The lens module 20 is provided with a first lens 1a, a second lens 1b, and the filter unit 2. The first lens 1a and the second lens 1b constitute the main lens 1. This configuration is, however, just an example and any other configuration may be adopted as long as the filter unit 2 is arranged at the aperture position of the optical elements constituting the main lens 1.

The camera unit 30 is provided with the micro lens array 3, the light receiving element array 4, and a frame memory 31. The frame memory 31 temporarily stores a light field image output by the light receiving element array 4.

The arithmetic processor 40, which performs various arithmetic processings on an image obtained by the camera unit 30, is provided with processing functions of a spectral-response-coincidence-degree calculator 41, a position identifier 42, an area detector 43, and a color detector 44 as illustrated in FIG. 7. The arithmetic processor 40 is further provided with a storage unit 45 which is realized by a non-volatile RAM and stores the positional information. The storage unit 45 is capable of storing positional information identified by the position identifier 42, which will be explained later, in a form of a look-up table, for example. The storage unit 45 may be provided at an outside of the arithmetic processor 40.

The spectral-response-coincidence-degree calculator 41 and the position identifier 42, which function to store the positional information in the storage unit 45, among the processing functions of the arithmetic processor 40 are called up in response to a predetermined operation by an adjustment operator in an adjustment to be made before an actual device is shipped or at an arbitrary timing after the shipping. The area detector 43 and the color detector 44, which function to detect the color of the object by actually using the light field image, are called up each time when the light receiving element array 4 outputs the light field image in capturing an image of the object.

The spectral-response-coincidence-degree calculator 41 performs a processing of calculating a spectral responsivity of each of the pixels constituting the light field image based on a set of light field images output by the light receiving element array 4 when inspection light having monochromaticity is made to enter the filter unit 2 of the optical system while the wavelength of the inspection light is sequentially changed, and calculating a spectral-response-coincidence-degree which indicates a degree of coincidence between the spectral responsivity and desired wavelength selectivity.

Figure 8:
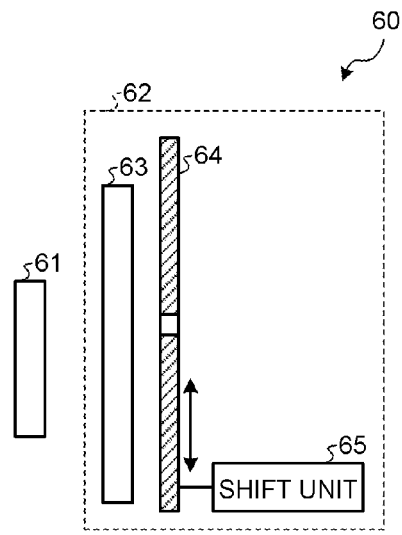
FIG. 8 illustrates an example of a configuration of an inspection light generator.

The inspection light is generated by an inspection light generator 60 illustrated in FIG. 7. FIG. 8 illustrates an example of a configuration of the inspection light generator 60. The inspection light generator 60 is provided with a light source 61 such as a xenon lamp and a spectral unit 62 which transmits and uses as the inspection light having monochromaticity the light emitted from the light source 61. The spectral unit 62 is provided with a diffraction grating 63 that disperses the light emitted from the light source 61 into light beams of different wavelengths, a slit 64 that selectively transmits the light beams of different wavelengths dispersed by the diffraction grating 63, and a shift unit 65 that changes the position of the slit 64 with respect to the diffraction grating 63 to change the wavelength of the light to be transmitted through the slit 64 as illustrated in FIG. 8 for example.

In the inspection light generator 60 with the configuration illustrated in FIG. 8, the light emitted from the light source 61 is dispersed for each wavelength by the diffraction grating 63. To obtain a light beam of a particular wavelength from the light dispersed by the diffraction grating 63, the slit 64 having a narrow gap is arranged anteriorly to the diffraction grating 63 (at an opposite side of the light source 61). It is possible to make monochromatic light beams (inspection light beams) which have different wavelengths sequentially enter the imaging device 10 by changing the position of the slit 64 by the shift unit 65.

Figure 9:
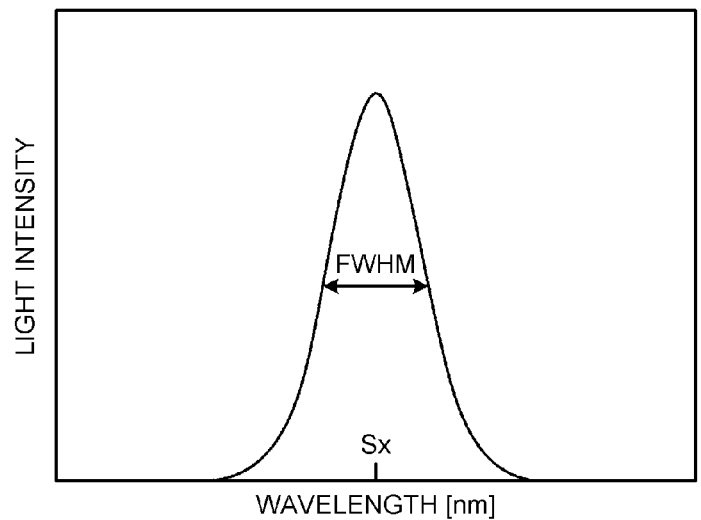
FIG. 9 is an explanatory view of a definition of a monochromaticity of light.

FIG. 9 is an explanatory view of a definition of a monochromaticity of light. In the present embodiment, a light whose half value width (FWHM: Full Width at Half Max) is equal to or less than 40 nm is treated as light having monochromaticity as illustrated in FIG. 9. Since an accuracy of the spectral responsivity with respect to a target wavelength degrades when the half value width becomes larger, a smaller half value width is preferable. Since the number of signals decreases as a result of the trade-off, however, it is preferable to use, as the inspection light, a light beam whose half value width is small within a range in which an adequate signal-to-noise ratio can be obtained.

In adjusting the imaging device 10, the inspection light generator 60 as explained above is used to cause monochromatic light beams of every 5 nm from 400 nm to 700 nm, for example, to enter the optical system and a light field image is captured for each wavelength. This operation enables obtaining a set of 61 light field images.

The spectral-response-coincidence-degree calculator 41 first calculates a spectral responsivity of each of pixels constituting the light field image based on the set of images obtained in this manner. In other words, a certain pixel is focused and values of the pixel at the same position are extracted from the set of the 61 images to obtain the spectral responsivity of the pixel. The spectral-response-coincidence-degree calculator 41 performs this processing with respect to each of the pixels constituting the light field image to calculate the spectral responsivity of each pixel.

The spectral-response-coincidence-degree calculator 41 then calculates a spectral-response-coincidence-degree which indicates a degree of coincidence between the spectral responsivity obtained in the above-explained manner and desired wavelength selectivity (equivalent to a color-matching function) with respect to each of the pixels constituting the light field image.

Figure 10:
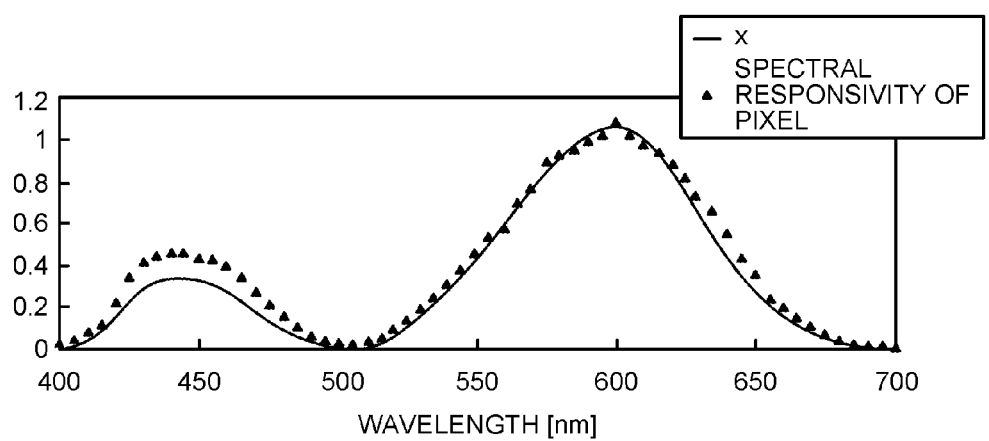
FIG. 10 illustrates a relation between a spectral responsivity of a certain pixel and a color-matching function with respect to X of an XYZ color system.

FIG. 10 illustrates a relation between a spectral responsivity of a certain pixel and a color-matching function with respect to X of the XYZ color system. A solid line in FIG. 10 indicates a color-matching function with respect to X, an aggregation of plotted triangular black dots indicates the spectral responsivity of the certain pixel. FIG. 10 reveals that the spectral responsivity of the certain pixel does not completely correspond to the color-matching function.

The spectral-response-coincidence-degree calculator 41 is capable of calculating the spectral-response-coincidence-degree through a method shown below, for example.

Based on the values for every 5 nm from 400 nm to 700 nm of the color-matching function, the color-matching function is expressed by 61-dimensional vector x as represented in Equation (1) below.

$$x=[x_{400},x_{405},\ldots,x_{700}] \quad (1)$$

Similarly, the spectral responsivity of the certain pixel is expressed by 61-dimensional vector k as represented in Equation (2).

$$k=[k_{400},k_{405},\ldots,k_{700}] \quad (2)$$

Since we want to know how approximate to the desired wavelength selectivity (color-matching function) the spectral responsivity of the pixels constituting the light field image captured by the imaging device 10 is, an inner product of the vector x and the vector k "S=x·k" is calculated and treated as the spectral-response-coincidence-degree. The spectral-response-coincidence-degree calculator 41 performs this processing with respect to each of the pixels constituting the light field image to calculate the spectral-response-coincidence-degree of each pixel.

The position identifier 42 uses the spectral-response-coincidence-degree of each pixel obtained by the processing by the spectral-response-coincidence-degree calculator 41 to identify respective positions of the image areas $M_X$, $M_Y$, and $M_Z$, respectively corresponding to the filter areas $F_X$, $F_Y$, and $F_Z$ of the filter unit 2, within a macro pixel, and stores the positional information in the storage unit 45.

There are some possible methods in which the position identifier 42 identifies the positions of the image areas $M_X$, $M_Y$, and $M_Z$ within the macro pixel. For example, there is a method of treating one pixel whose spectral-response-coincidence-degree is the largest with respect to the color-matching function of X among the pixels constituting the macro pixel as a pixel within the image area $M_X$ and storing the positional information of the pixel. This method causes a considerable variation while enhancing the accuracy in color detection by the color detector 44 to be explained later.

Besides, there is a method of treating a pixel whose spectral-response-coincidence-degree with respect to the color-matching function of X is the largest and its surrounding pixels as pixels within the image area $M_X$ and storing the positional information of the pixels. This method has a merit of enabling suppressing a variation due to an averaging effect and balancing the accuracy and the variation by adjusting the range of the surrounding pixels while causing degradation in accuracy in the color detection compared to the above-explained method.

Moreover, there is a method of setting a threshold for the spectral-response-coincidence-degree with respect to the color-matching function of X, treating a pixel whose spectral-response-coincidence-degree with respect to the color-matching function of X is equal to or more than the threshold as a pixel within the image area $M_X$ among the pixels constituting the macro pixel, and storing the positional information of the pixel. This method enables securing the performance in accuracy above a certain level in color detection.

While the case of identifying the position of the image area $M_X$ is taken as an example and explained so far, it is possible to identify the positions of the image areas $M_Y$ and $M_Z$ in the same methods.

Based on the positional information stored in the storage unit 45, the area detector 43 detects respective image areas $M_X$, $M_Y$, and $M_Z$ of each macro pixel from the light field image output by the light receiving element array 4 in capturing an image of the object, i.e., when the light from the object enters the filter unit 2. The area detector 43 according to the present embodiment rearranges output values of the detected image areas $M_X$, $M_Y$, and $M_Z$ depending on the position of the macro pixel to generate an intermediate image.

Specifically, the area detector 43 detects the image area $M_X$ of each of the macro pixels included in the light field image and rearranges the output value of the detected image area $M_X$ (an average value of pixels constituting the image area $M_X$, for example) in accordance with the position (i, j) of each macro pixel to generate an intermediate image corresponding to the filter area $F_X$ of the filter unit 2. In other words, when (i, j)=(1, 1) is true, the output value of the image area $M_X$ within the macro pixel at an upper left end of the light field image, for example, is treated as a value of a pixel at the upper left end of the intermediate image. This processing is performed with respect to all the macro pixels included in the light field image to generate the intermediate image as a two-dimensional image formed by the light transmitted through the filter area $F_X$ of the filter unit 2.

The area detector 43 performs the same processing with respect to the image areas $M_Y$ and $M_Z$ within each of the macro pixels included in the light field image to generate an intermediate image corresponding to the filter area $F_Y$ and tan intermediate image corresponding to the filter area $F_Z$ of the filter unit 2.

The color detector 44 detects the color of the object in the above-explained method based on the output values of the image areas $M_X$, $M_Y$, and $M_Z$ detected by the area detector 43. The color detector 44 according to the present embodiment is capable of individually detecting colors at different positions of the object by using three intermediate images generated by the area detector 43 (three intermediate images corresponding to the filter areas $F_X$, $F_Y$, and $F_Z$ of the filter unit 2).

The area detector 43 may be configured to obtain representative output values of the three image areas $M_X$, $M_Y$, and $M_Z$ instead of generating respective intermediate images corresponding to the three image areas $M_X$, $M_Y$, and $M_Z$. In this case, the color detector 44 detects the color of the object based on the representative output values of the three image areas $M_X$, $M_Y$, and $M_Z$.

As explained so far, the spectral-response-coincidence-degree of each of the pixels of the light field image is calculated in adjustment, the respective positions of the image areas $M_X$, $M_Y$, and $M_Z$ respectively corresponding to the filter areas $F_X$, $F_Y$, and $F_Z$ of the filter unit 2 are identified by using the spectral-response-coincidence-degree, and the positional information is stored in the storage unit 45 in the imaging device 10 according the present embodiment. In actually capturing an image of the object and detecting the color of the object by using the imaging device 10, it is possible to use the positional information stored in the storage unit 45 and correctly detect the image areas $M_X$, $M_Y$, and $M_Z$ of each macro pixel from the light field image obtained by the image capturing of the object. It is then possible to detect the color of the object properly based on the output values of the detected image areas $M_X$, $M_Y$, and $M_Z$.

Figure 11:
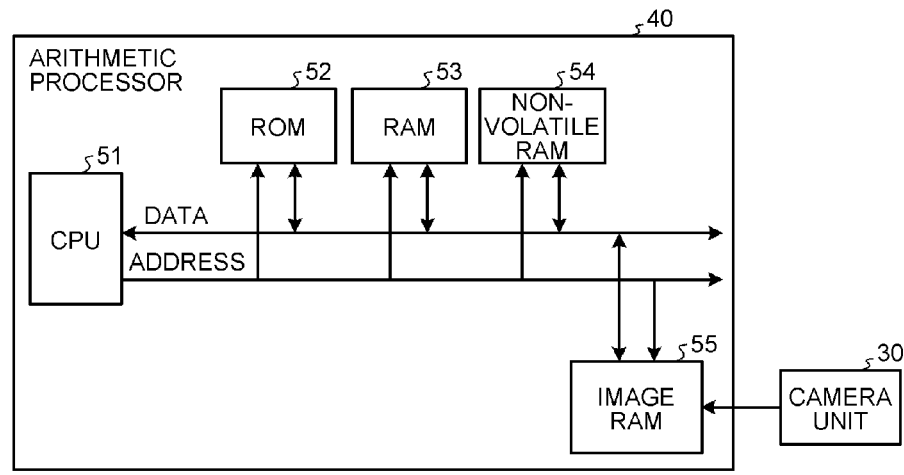
FIG. 11 illustrates an example of a hardware configuration of an arithmetic processor.

FIG. 11 illustrates an example of a hardware configuration of the arithmetic processor 40. The arithmetic processor 40 is provided with a CPU (Central Processing Unit) 51, a ROM (Read Only Memory) 52 storing therein programs causing the CPU 51 to operate, a RAM (Random Access Memory) 53 used as a work memory when the CPU 51 executes the programs, a non-volatile RAM 54 used as the storage unit 45, and an image RAM 55 that temporarily stores image data from the camera unit 30 as illustrated in FIG. 11, for example.

The CPU 51 uses the RAM 53 to read out and execute the programs stored in the ROM 52, for example, so that the processing functions (the spectral-response-coincidence-degree calculator 41, the position identifier 42, the area detector 43, and the color detector 44) of the arithmetic processor 40 illustrated in FIG. 7 are realized. A part or all of the processing functions of the arithmetic processor 40 may be realized by a dedicated hardware such as an ASIC (Application Specific Integrated Circuit) or an FPGA (Field-Programmable gate Array), for example.

As explained in detail with specific examples so far, it is possible in the imaging device 10 according to the present embodiment to accurately identify the positions, corresponding to the filter areas $F_X$, $F_Y$, and $F_Z$ of the filter unit 2, within the image and to property perform the color detection of the object and the like.

Second Embodiment

Next, a second embodiment will be explained. In a second embodiment, an adjusting device performs the processing of calculating the spectral-response-coincidence-degree with respect to each of the pixels constituting the light field image in adjustment and the processing of identifying the positions of the image areas $M_X$, $M_Y$, and $M_Z$ by using the spectral-response-coincidence-degree and storing positional information in the storage unit 45. The same component as the first embodiment will be assigned with the same reference symbol, a redundant explanation will be omitted properly, and only a characteristic point of the second embodiment will be explained below.

Figure 12:
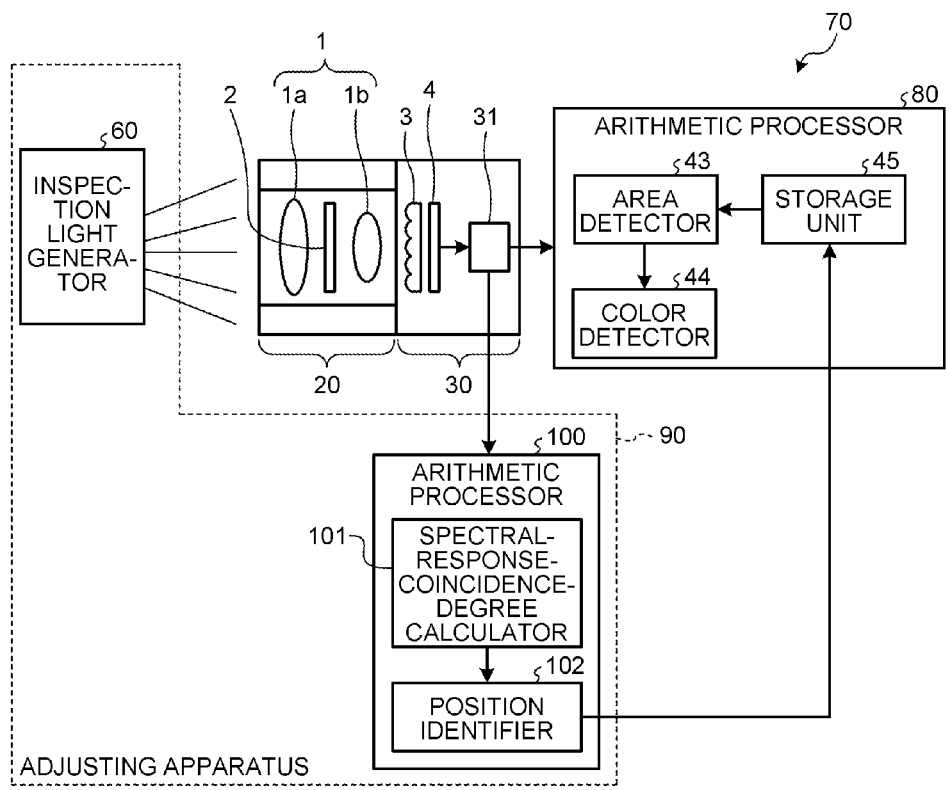
FIG. 12 illustrates an example of a specific configuration of an imaging device according to a second embodiment.

FIG. 12 illustrates an example of a specific configuration of an imaging device according to a second embodiment. An imaging device 70 illustrated in FIG. 12 is provided with the lens module 20, the camera unit 30, and an arithmetic processor 80. The lens module 20 and the camera unit 30 are the same as the first embodiment. The arithmetic processor 80, which is different from the arithmetic processor 40 according to the first embodiment, is provided only with the area detector 43 and the color detector 44 and not provided with the spectral-response-coincidence-degree calculator 41 and the position identifier 42.

In the second embodiment, an adjusting device 90 illustrated in FIG. 12 is used in adjusting the imaging device 70. The adjusting device 90 is provided with an arithmetic processor 100 in addition to the inspection light generator 60 which is the same as the first embodiment. The arithmetic processor 100 of the adjusting device 90 is provided with a spectral-response-coincidence-degree calculator 101 which is the same as the spectral-response-coincidence-degree calculator 41 according to the first embodiment and a position identifier 102 which is the same as the position identifier 42 according to the first embodiment.

The adjusting device 90 makes the inspection light generator 60 work in adjusting the imaging device 70 to cause the inspection light having monochromaticity to enter the filter unit 2 of the imaging device 70 while sequentially changing the wavelength of the inspection light. The adjusting device 90 obtains from the imaging device 70 and inputs to the arithmetic processor 100 a set of light field images output by the light receiving element array 4 each time when the inspection light of each wavelength enters the filter unit 2.

The spectral-response-coincidence-degree calculator 101 of the arithmetic processor 100 calculates the spectral responsivity of each of the pixels constituting the light field image based on the set of light field images obtained from the imaging device 70 and calculates the spectral-response-coincidence-degree which indicates a degree of coincidence between the spectral responsivity and desired wavelength selectivity, similarly to the spectral-response-coincidence-degree calculator 41 according to the first embodiment.

The position identifier 102 of the arithmetic processor 100 uses the spectral-response-coincidence-degree of each pixel obtained by the processing by the spectral-response-coincidence-degree calculator 101 to identify respective positions of the image areas $M_X$, $M_Y$, and $M_Z$, respectively corresponding to the filter areas $F_X$, $F_Y$, and $F_Z$ of the filter unit 2, within the macro pixel and stores the positional information in the storage unit 45, similarly to the position identifier 42 according to the first embodiment.

FIG. 13 is a flowchart of a procedure of a processing of the adjusting device 90 in making the adjustment to the imaging device 70. Here, the procedure from steps S101 to S105 illustrated in the flowchart in FIG. 13 is applicable to the adjustment to the imaging device 10 according to the first embodiment.

In making the adjustment to the imaging device 70, the adjusting device 90 first makes the inspection light generator 60 work to cause the inspection light having monochromaticity to enter the filter unit 2 of the imaging device 70 while sequentially changing the wavelength of the inspection light (step S101).

Next, the spectral-response-coincidence-degree calculator 101 of the adjusting device 90 obtains the set of light field images output by the light receiving element array 4 of the imaging device 70 (step S102) and calculates the spectral responsivity of each of the pixels constituting the light field image based on the set of light field images (step S103).

The spectral-response-coincidence-degree calculator 101 next calculates the spectral-response-coincidence-degree which indicates a degree of coincidence between the spectral responsivity calculated at step S103 and desired wavelength selectivity with respect to each of the pixels constituting the light field image (step S104).

Next, the position identifier 102 of the adjusting device 90 uses the spectral-response-coincidence-degree of each pixel obtained by the processing by the spectral-response-coincidence-degree calculator 101 to identify respective positions of the image areas $M_X$, $M_Y$, and $M_Z$, respectively corresponding to the filter areas $F_X$, $F_Y$, and $F_Z$ of the filter unit 2, within the macro pixel, stores the positional information in the storage unit 45 (step S105), and ends the adjustment of the imaging device 70.

As explained so far, the adjusting device 90 is configured to perform the processing of calculating the spectral-response-coincidence-degree with respect to each of the pixels of the light field image and the processing of identifying the positions of the image areas $M_X$, $M_Y$, and $M_Z$ by using the spectral-response-coincidence-degree and storing the positional information in the storage unit 45 in the second embodiment. Hence, it is possible to obtain the same advantages as the first embodiment while reducing a load of the processing in the imaging device 70.

First Modification

In the first and the second embodiments, the diffraction grating 63, the slit 64, and the shift unit 65 constitute the spectral unit 62 of the inspection light generator 60. However, the present invention is not limited to this example and an absorption filter using pigment or an interference filter using a dielectric multi-layer may be used for the spectral unit 62, for example.

Second Modification

In the first and the second embodiments, a xenon lamp is used for the light source 61 of the inspection light generator 60. However, the present invention is not limited to the xenon lamp and a halogen lamp, a light emitting diode, and the like may be used for the light source 61, for example. Since having intensity over a wide range of wavelengths similarly to the xenon lamp while a light intensity at short wavelength side is lower than a xenon lamp, a halogen lamp may be used for the light source 61. Besides, though a range of wavelengths is generally narrow compared to a xenon lamp and a halogen lamp, a light emitting diode may be used for the light source 61.

According to the embodiments as described above, there is an advantage of being capable of accurately identifying a position, corresponding to each filter area of a filter unit, within an image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
 a filter unit including a plurality of filter areas having different wavelength selectivities;
 a light receiving element array configured to receive light transmitted through the filter unit and output an image;
 a storage unit configured to store, for each of the filter areas, positional information indicating a position at which light transmitted through each of the filter areas is received on the light receiving element array;
 an area detector configured to detect, based on the positional information, an image area corresponding to the light transmitted through each of the filter areas from the image output by the light receiving element array when light from an object enters the filter unit; and a color detector configured to detect a color of the object based on an output value of the detected image area, wherein the positional information corresponding to each of the filter areas indicates a position on the light receiving element array which is identified by using a spectral-response-coincidence-degree indicating a degree of coincidence between a spectral responsivity of each pixel and a desired wavelength selectivity, the spectral responsivity of each pixel being calculated based on a set of images output by the light receiving element array when monochromatic inspection light with a different wavelength sequentially enters the filter unit.

2. The imaging device according to claim 1, further comprising:

a spectral-response-coincidence-degree calculator configured to calculate the spectral-response-coincidence-degree of each pixel; and a position identifier configured to identify the position at which the light transmitted through each of the filter areas is received on the light receiving element array by using the spectral-response-coincidence-degree, and store in the storage unit the positional information indicating the identified position as the positional information corresponding to each of the filter areas.

3. The imaging device according to claim 1, wherein the spectral-response-coincidence-degree is an inner product of the desired wavelength selectivity and the spectral responsivity.

4. The imaging device according to claim 1, wherein the filter unit includes at least three filter areas with spectral transmittance based on a color-matching function.

5. An adjusting device for adjusting an imaging device that includes a filter unit including a plurality of filter areas having different wavelength selectivities, a light receiving element array configured to receive light transmitted through the filter unit and output an image, and a storage unit configured to store, for each of the filter areas, positional information indicating a position at which light transmitted through each of the filter areas is received on the light receiving element array, the adjusting device comprising:

an inspection light generator configured to cause monochromatic inspection light with a different wavelength to sequentially enter the filter unit;

a spectral-response-coincidence-degree calculator configured to calculate a spectral responsivity of each pixel based on a set of images output by the light receiving element array when the inspection light enters the filter unit, and calculate a spectral-response-coincidence-degree indicating a degree of coincidence between a desired wavelength selectivity and the spectral responsivity; and a position identifier configured to identify the position at which the light transmitted through each of the filter areas is received on the light receiving element array by using the obtained spectral-response-coincidence-degree, and store in the storage unit the positional information indicating the identified position as the positional information corresponding to each of the filter areas.

6. The adjusting device according to claim 5, wherein the inspection light generator includes a light source and a spectral unit configured to transmit a light emitted from the light source and use the light as the inspection light.

7. The adjusting device according to claim 6, wherein the spectral unit includes a diffraction grating configured to disperse the light emitted from the light source into light with different wavelengths, a slit configured to selectively transmit the light with a different wavelength dispersed by the diffraction grating, and a shift unit configured to change a position of the slit with respect to the diffraction grating to select a wavelength of light to be transmitted through the slit.

8. The adjusting device according to claim 6, wherein the spectral unit is one of an absorption filter using a pigment and an interference filter using a dielectric multi-layer.

9. The adjusting device according to claim 6, wherein the light source is any one of a xenon lamp, a halogen lamp, and a light emitting diode.

10. An adjusting method for adjusting an imaging device that includes a filter unit including a plurality of filter areas having different wavelength selectivities, a light receiving element array configured to receive light transmitted through the filter unit and output an image, and a storage unit configured to store, for each of the filter areas, positional information indicating a position at which light transmitted through each of the filter areas is received on the light receiving element array, the adjusting method comprising:

causing monochromatic inspection light with a different wavelength to sequentially enter the filter unit;

calculating a spectral responsivity of each pixel based on a set of images output by the light receiving element array when the inspection light enters the filter unit;

calculating a spectral-response-coincidence-degree indicating a degree of coincidence between a desired wavelength selectivity and the spectral responsivity;

identifying the position at which the light transmitted through each of the filter areas is received on the light receiving element array by using the obtained spectral-response-coincidence-degree; and storing in the storage unit the positional information indicating the identified position as the positional information corresponding to each of the filter areas.

\* \* \* \* \*